United States Patent Office 2,955,919
Patented Oct. 11, 1960

2,955,919

STABILIZATION OF PHOSPHORIC ACID

Joseph F. Wilson, Bartlesville, Okla., assignor to Phillips Petroleum Company, a corporation of Delaware No Drawing. Filed July 29, 1957, Ser. No. 674,634

17 Claims. (Cl. 23—165)

This invention relates to the stabilization of phosphoric acid. More particularly, it relates to a method for inhibiting the formation of solids in phosphoric acid produced according to the so-called "wet process" by acidulating phosphate rock or other phosphatic material with an acid.

Many processes have been suggested, patented, or employed in the past for the manufacture of phosphoric acid. The so-called "wet process" for producing phosphoric acid has been extensively used because of its simplicity and economic operation. According to this process, phosphate rock is treated in a series of reactors with concentrated sulfuric acid to produce a slurry of soluble phosphoric acid and insoluble calcium sulfate (gypsum). The slurry is filtered and the resulting dilute phosphoric acid filtrate may then be concentrated for the production of triple superphosphate or other phosphatic fertilizer material. The dilute acid can be transferred to storage tanks where small but significant amounts of precipitated solid impurities settle in the storage tanks and cause handling problems.

The dilute acid can be concentrated and pumped to storage tanks where during storage appreciable amounts of impurities precipitate in solid form. When the concentrated acid is used for the production of triple superphosphate, it is pumped to a mixer and reacted with phosphate rock. The presence of the settled solids causes difficulty in handling the acid due to the fact that these solids tend to plug the lines, valves, and acid spraying nozzles in the mixer and often result in the shutting down of the triple superphosphate plant in order to clean the nozzles and other plugged equipment.

If the concentrated acid is to be employed for other purposes, generally it is pumped to unagitated storage tanks where the solids formed from the impurities are allowed to settle. Clarified acid is drawn off the tops of these tanks and the acid in the slurries in the bottoms of these tanks must be recovered by some means to maintain plant efficiency. During the settling period expensive tankage is tied up and the tanks must be cleaned out periodically. While this method of clarifying the acid is generally suitable, additionally formed solids slowly continue to settle out in the clarified acid and present further handling difficulties.

The impurities inherently present in phosphoric acid made according to the wet process comprise mainly dissolved salts of iron, aluminum and calcium, as established by analysis. In addition, lesser amounts of other impurities are generally present, including fluorides, fluorosilicates and dissolved salts of silicon, magnesium, copper, sodium, zinc, uranium, and vanadium. These impurities precipitate and settle out as solids or sludge at a slow rate occurring over an interval of several days and even weeks. The amount of total solids which settle out varies, generally from 0.5 to 10 percent by weight of acid and their composition varies during aging of the acid.

Accordingly, an object of this invention is to stabilize phosphoric acid. A further object is to inhibit in a novel and economical manner the formation of precipitated solid impurities in phosphoric acid produced according to the so-called wet process. Another object is to inhibit precipitation of impurities inherently present in phosphoric acid, principally the dissolved salts of calcium, iron, and aluminum. A further object is to simplify the purification and handling of phosphoric acid by stabilizing the latter so as to render it substantially solids-free over a relatively long period of time and thereby prevent plugging of pipes, valves, nozzles, and the like. Other objects and advantages of my invention will become apparent to those skilled in the art from the following discussion and appended claims.

Broadly contemplated, I propose by the practice of my invention to inhibit the precipitation of impurities, principally dissolved salts of calcium, iron and aluminum, normally incident in phosphoric acid produced according to the wet process, by adding to the acid a minor but sufficient amount of polymer prepared from a heterocyclic nitrogen base monomer of the pyridine series containing the

group where R is a member selected from the group consisting of hydrogen and methyl radicals. In addition, various alkyl substituted derivatives of these heterocyclic nitrogen bases can be used as monomers. Polymers which are suitable for use according to this invention are those which are soluble or dispersible in the phosphoric acid to the extent necessary to substantially or completely inhibit the precipitation of solid impurities.

The heterocyclic nitrogen base compounds used in preparing the polymers used in this invention can be represented by the formula:

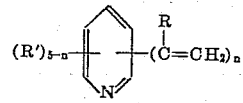

where $n$ is an integer from 1 to 2, R is a member selected from the group consisting of H and $CH_3$, and R' is a member selected from the group consisting of H and alkyl radicals, not more than 12 carbon atoms being present in the total of said R'.

Representative heterocyclic nitrogen base compounds useful as monomers in the practice of this invention include: 2-vinylpyridine; 4-vinylpyridine; 2-vinyl-5-ethylpyridine; 2-methyl-5-vinylpyridine; 5-methyl-2-vinylpyridine; 3-ethyl-5-vinylpyridine; 4-methyl-3-vinylpyridine; 2,3,4-trimethyl-5-vinylpyridine; 2,6-diethyl-4-vinylpyridine; 2,5-divinylpyridine; 2-isopropenylpyridine; 2-isopropyl-4-nonyl - 5 - vinylpyridine; 5-propyl-2-isopropenylpyridine; 2-octyl-5-vinylpyridine; and the like.

In addition to homoplymers of the above-described heterocyclic nitrogen base compounds, copolymers of the same with other polymerizable monomers containing an active vinylidene group, e.g., $CH_2=C<$, are useful in the practice of this invention. These other copolymerizable materials representatively include: conjugated dienes; styrene; nuclear substituted alkyl styrenes; para-chlorostyrene; para-methoxystyrene; methyl acrylate; ethyl acrylate; methyl methacrylate; ethyl methacrylate; butyl methacrylate; acrylonitrile; methacrylonitrile; methacrylamide; methyl isopropenyl ketone; methyl vinyl ketone; methyl vinyl ether; vinyl acetate; vinyl chloride; vinylidene chloride; vinylfurane; vinylcarbozole; vinylacetylene; and the like.

The conjugated dienes employed in the production of the copolymers employed in the practice of this invention are preferably those conjugated dienes which contain four to six, inclusive, carbon atoms per molecule and representatively include 1,3-butadiene; isoprene; piperylene; methylpentadiene; 2,3-dimethyl-1,3-butadiene; chloroprene; and the like. However, conjugated dienes having more than 6, such as 8, carbon atoms per molecule can also be used. Furthermore, various alkoxy derivatives, such as methoxy and ethoxy, and cyano derivatives of these conjugated dienes can also be used in the process of my invention.

Where copolymers are employed, I prefer to use conjugated dienes, especially 1,3-butadiene, as comonomers.

It is essential, however, that the above-mentioned polymers must be dispersible or soluble in the phosphoric acid. The term "dispersible" is used hereinafter to generically include colloidally dispersed as well as soluble polymers. To achieve dispersibility, the heterocyclic nitrogen base compound commonly will be used in amount greater than about 25 parts by weight per 100 parts of total monomers, preferably greater than about 50 parts by weight per 100 parts of total monomers.

The polymers employed in the practice of this invention to stabilize phosphoric acid are well known compounds in the polymer art and can be prepared by any suitable method, e.g., emulsion polymerization. One convenient method of preparing these polymers is to effect the polymerization in an aqueous emulsion in the presence of soap, potassium persulphate, and an aliphatic mercaptan if desired. At the conclusion of the reaction a conventionally used short stopping agent and an antioxidant are added. Coagulation can be effected by the various well known techniques and the polymer can then be dried.

The polymers can be added to the phosphoric acid in any convenient manner. In some cases it may be desirable to prepare a concentrated solution or suspension of the polymer in an acid solution, such as crude phosphoric acid, or other suitable solvent. The concentrated solution or suspension can then be added to the phosphoric acid desired to be stabilized. The polymer can be added to freshly prepared dilute (e.g., 5 to 40 percent) phosphoric acid as it is being pumped into tanks for storage or for shipment. Such freshly prepared acid generally contains but a small amount of suspended solids and further precipitation can be inhibited completely or substantially minimized by adding the polymer of this invention. The polymer is preferably added to the concentrated acid (e.g., 40 to 75 percent). In some instances, the polymer added to dilute phosphoric acid will provide some stabilizing effect subsequent to concentration of the acid. In other instances it may be desirable to add additional polymer after concentration of the acid.

It has also been found that when the phosphoric acid contains an appreciable amount of precipitated material, as is the case with aged, dilute or concentrated phosphoric acid, the acid can be first heated to effect solution of part or all of the precipitate. The precipitate which remains, if any, can be removed by filtration or the like and the clarified acid treated in accordance with this invention.

In still another method of operation, aged, precipitate-containing phosphoric acid can be clarified by filtration without heating and the clarified acid then treated with the polymer of this invention to inhibit further precipitation of solid impurities.

The amount of the polymer to be used to inhibit the precipitation of impurities in the phosphoric acid will depend upon several factors, such as the amount of impurities present in the acid, the age of acid, the particular polymer employed, the prior or subsequent treatment of the acid, the use of the acid, etc. Accordingly, I prefer to define the limits of amounts of polymer to be used in stabilizing the phosphoric acid by functional rather than by actual numerical limits, the amount to be used being an amount sufficient to inhibit the formation of precipitates of solid impurities during storage or use of the acid. Those skilled in the art will be able to determine the particular amounts to be used by simple routine tests. Generally, the amount to be used will fall in the range of 0.01 to 5 percent by weight of the acid.

The following examples amply demonstrate the merits of my invention; but it is to be understood that these examples are merely illustrative and only set forth preferred embodiments of my invention.

EXAMPLE I

Wet process phosphoric acid (about 52% $P_2O_5$) was heated at 90° C. for one hour, filtered, and aliquots were mixed, while hot, with 0, 0.67, 1.9 and 4.0 percent by weight of a 50:50 copolymer of 1,3-butadiene and 2-methyl-5-vinylpyridine. The aliquots each weighed 64 grams and were contained in glass vials (approximately 4 inches in height and 1 inch in diameter). The copolymer was dispersed in the acid by agitation for one hour. The vials were then set aside and observations were made at various intervals of time as to the depth of sediment in each vial. The results (see Table I) demonstrated that precipitation of solid impurities was effectively inhibited for all acids treated with the polymer.

Table I

| Weight Percent of Polymer | Precipitate Depth in Vial (inches) | | | |
|---|---|---|---|---|
| | 1 day | 4 days | 5 days | 8 days |
| 0.0 | 1.0 | 1.1 | | |
| 0.67 | 0 | 0 | 0 | 1 0 |
| 1.9 | 0 | 0 | 0 | |
| 4.0 | 0 | 0 | 0 | 0 |

1 Some turbidity in the acid but negligible settling.

EXAMPLE II

A 10-day old sample of plant acid (about 52% $P_2O_5$) which contained some precipitate was clarified by centrifuging. Aliquots of the clarified acid in vials described in Example I were treated with a 50:50 copolymer of 1,3-butadiene and 2-methyl-5-vinylpyridine in amounts of 0, 0.1, 0.3, 0.5, and 1.0 percent by weight of the acid. Observations were made at various intervals of time as to sediment depth in each vial and the results tabulated (see Table II). Effective inhibition of precipitation of solid impurities was achieved for copolymer concentrations of 0.3 percent and greater.

Table II

| Weight Percent of Copolymer | Precipitate Depth in Vial (inches) | | | |
|---|---|---|---|---|
| | 1 day | 4 days | 5 days | 8 days |
| 0.0 | 0.06 | 0.20 | 0.25 | 0.25 |
| 0.1 | 0 | trace | trace | 0.06 |
| 0.3 | 0 | 0 | 0 | trace |
| 0.5 | 0 | 0 | 0 | 0 |
| 1.0 | 0 | 0 | 0 | 0 |

EXAMPLE III

A 14-day old sample of wet process phosphoric acid (50.9% $P_2O_5$, 2.4% $H_2SO_4$) was heated and maintained at 90° C. for 1 hour, and after 2 hours aging at this temperature was decanted into vials containing various amounts of a homopolymer of 2-methyl-5-vinylpyridine. Each vial contained 6 grams of acid and the polymer concentrations in the different vials were 0, 0.03, 0.06, 0.12, 0.20, 0.90 and 2.0 percent by weight of the acid. Observations were made over a 4-day period of the depth of precipitate which settled in each vial. The results are given in Table III and demonstrate effective inhibition of precipitation at concentrations 0.2 percent and higher.

Table III

| Weight Percent Polymer | Precipitate Depth in Vial (inches) | | |
|---|---|---|---|
| | 2 hours | 2 days | 4 days |
| 0 | 0.03 | 0.12 | 0.12 |
| 0.03 | 0.06 | 0.06 | 0.06 |
| 0.06 | 0.06 | 0.06 | 0.06 |
| 0.12 | 0.06 | 0.06 | 0.06 |
| 0.20 | 0.00 | 0.00 | trace |
| 0.90 | 0.00 | 0.00 | 0.00 |
| 2.0 | 0.00 | 0.00 | 0.00 |

EXAMPLE IV

A sample of wet process crude phosphoric acid from a commercial plant which was 10 days old and contained 52.6% $P_2O_5$ was decanted to remove sediment. The clarified acid was poured into vials containing various amounts of a homopolymer of 2-methyl-5-vinylpyridine. The results of these tests (see Table IV) showed marked inhibition of precipitation for polymer concentrations as low as 0.08 percent and complete inhibition at concentrations as low as 0.2 percent.

Table IV

| Weight Percent Polymer | Precipitate Depth in Vial (inches) | | | |
|---|---|---|---|---|
| | 1 day | 3 days | 5 days | 7 days |
| 0 | 0.13 | 0.13 | 0.20 | 0.20 |
| 0.03 | 0.13 | 0.13 | 0.20 | 0.20 |
| 0.08 | 0.13 | 0.13 | 0.13 | 0.13 |
| 0.10 | 0.06 | 0.06 | 0.06 | 0.13 |
| 1.15 | 0 | 0 | trace | 0.06 |
| 0.20 | 0 | 0 | 0 | 0 |
| 1.0 | 0 | 0 | 0 | 0 |

Various modifications and alterations of my invention will become apparent to those skilled in the art without departing from the scope and spirit thereof. Furthermore, it is to be understood that the foregoing discussion and examples merely represent preferred embodiments of my invention and the same is not to be unduly limited thereto.

I claim:

1. A method for treating crude wet-process phosphoric acid containing normally incident impurities which precipitate as solids, which method comprises adding to said acid a polymer in an amount sufficient to inhibit said precipitation, said polymer being prepared from a heterocyclic nitrogen base monomer containing the

group where R is a member selected from the group consisting of hydrogen and methyl radicals.

2. A method for treating crude wet-process phosphoric acid containing normally incident impurities which precipitate as solids, said impurities comprising dissolved salts of calcium, iron and aluminum, which method comprises adding to said acid a polymer in an amount sufficient to inhibit said precipitation, said polymer being prepared from a polymerizable heterocyclic nitrogen base monomer of the pyridine series containing the terminal

group where R is a member selected from the group consisting of hydrogen and methyl radicals.

3. A method for treating crude wet-process phosphoric acid containing normally incident impurities which precipitate as solids, which method comprises adding to said acid a polymer in an amount sufficient to inhibit said precipitation, said polymer being prepared from a polymerizable heterocyclic nitrogen base monomer having the formula

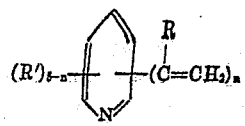

where $n$ is an integer from 1 to 2, R is a member selected from the group consisting of hydrogen and methyl radicals, and R' is a member selected from the group consisting of hydrogen and alkyl radicals, not more than 12 carbon atoms being present in the total of said R' groups.

4. The method according to claim 3 wherein said polymer is a homopolymer of 2-methyl-5-vinylpyridine.

5. The method according to claim 3 wherein said acid is dilute phosphoric acid having a concentration in the range of about 5 to 75 percent.

6. The method according to claim 3 wherein said acid is first clarified by centrifugation to remove a substantial amount of initially formed precipitates of said impurities before said polymer is added.

7. The method according to claim 3 wherein said acid is first heated before said polymer is added.

8. The method according to claim 3 wherein the amount of said polymer added to said acid is in the range of about 0.01 to 5 percent by weight of said acid.

9. A method for treating crude wet-process phosphoric acid containing normally incident impurities which precipitate as solids, which method comprises adding to said acid a copolymer in an amount sufficient to substantially inhibit said precipitation, said copolymer being prepared by polymerizing a heterocyclic nitrogen base monomer of the pyridine series containing the terminal

group, where R is a member selected from the group consisting of hydrogen and methyl radicals, with a copolymerizable monomer containing a terminal $CH_2=C<$ group.

10. A method for treating crude wet-process phosphoric acid containing normally incident impurities which precipitate as solids, said impurities comprising dissolved salts of calcium, iron and aluminum, which method comprises adding to said acid a copolymer in an amount sufficient to substantially inhibit said precipitation, said copolymer being prepared by polymerizing a heterocyclic nitrogen base monomer with a conjugated diene, said heterocyclic nitrogen base monomer having the formula

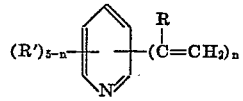

where $n$ is an integer from 1 to 2, R is a member selected from the group consisting of hydrogen and methyl radicals, and R' is a member selected from the group consisting of hydrogen and alkyl radicals, not more than 12 carbon atoms being present in the total of said R' groups.

11. The method according to claim 10 wherein said heterocyclic nitrogen base monomer is 2-methyl-5-vinylpyridine and said conjugated diene is 1,3-butadiene.

12. The method according to claim 10 wherein said heterocyclic nitrogen base monomer is used in an amount greater than about 25 parts by weight per 100 parts of total monomers when it is copolymerized with said conjugated diene.

13. The method according to claim 10 wherein said heterocyclic nitrogen base monomer is used in an amount greater than about 50 parts by weight per 100 parts of total monomers when it is copolymerized with said conjugated diene.

14. The method according to claim 10 wherein the amount of said copolymer added to said acid is in the range of about 0.01 to 5 percent by weight of said acid.

15. A method for treating crude wet-process phosphoric acid having a concentration in the range of about 40 to 75 percent and containing normally incident impurities which precipitate as solids, said impurities comprising dissolved salts of calcium, iron and aluminum, which method comprises first heating said acid and removing from said heated acid the initially formed precipitates of said impurities, and then adding to the heated acid containing a residual amount of said impurities about 0.01 to 5 weight percent of a polymer prepared by polymerizing 1,3-butadiene and 2-methyl-5-vinylpyridine, the amount of the latter monomer used to prepare said polymer being greater than 25 parts by weight per 100 parts of total monomers, thereby inhibiting the precipitation of said residual impurities remaining in said heated acid.

16. A method for treating crude wet-process phosphoric acid having a concentration in the range of about 40 to 75 percent and containing normally incident impurities which precipitate as solids, said impurities comprising dissolved salts of calcium, iron and aluminum, which method comprises clarifying said acid by centrifugation to remove the initially formed precipitates of said impurities, and then adding to the acid containing a residual amount of said impurities about 0.01 to 5 weight percent of a polymer prepared by polymerizing 1,3-butadiene and 2-methyl-5-vinylpyridine, the amount of the latter monomer used to prepare said polymer being greater than 25 parts by weight per 100 parts of total monomers, thereby inhibiting the precipitation of said residual impurities remaining in the clarified acid.

17. A method for treating crude wet-process phosphoric acid having a concentration in the range of about 40 to 75 percent and containing normally incident impurities which precipitate as solids, said impurities comprising dissolved salts of calcium, iron and aluminum, which method comprises first heating said acid, and then adding to the heated acid containing said impurities about 0.01 to 5 weight percent of a homopolymer of 2-methyl-5-vinylpyridine, thereby inhibiting the precipitation of said impurities in said heated acid.

References Cited in the file of this patent

UNITED STATES PATENTS

| | | |
|---|---|---|
| 2,499,283 | Robinson | Feb. 28, 1950 |
| 2,684,954 | Miller | July 27, 1954 |
| 2,729,557 | Booth et al. | Jan. 3, 1956 |
| 2,814,593 | Beiswanger et al. | Nov. 26, 1957 |

OTHER REFERENCES

Industrial and Engineering Chemistry, Poly-4-vinyl pyridine, Fitzgerald et al., vol. 42, issue 8, pp. 1603–1606, August 1950.